R. M. MERRIMAN.
FABRIC TIRE.
APPLICATION FILED JULY 19, 1916.
1,213,929.
Patented Jan. 30, 1917.
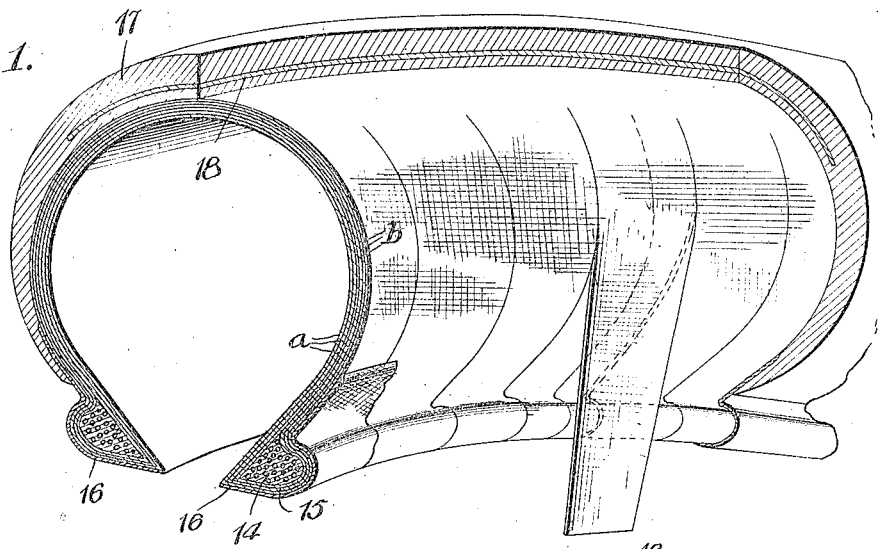
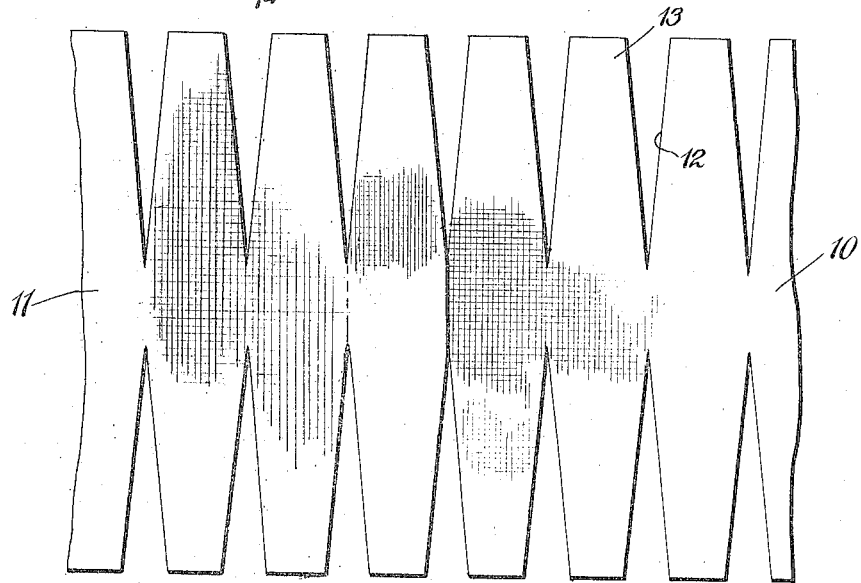
Inventor
R. M. Merriman,
By
Attorneys.

UNITED STATES PATENT OFFICE.

ROBERT M. MERRIMAN, OF AKRON, OHIO.

FABRIC TIRE.

1,213,929.  Specification of Letters Patent.  Patented Jan. 30, 1917.

Application filed July 19, 1916. Serial No. 110,104.

*To all whom it may concern:*

Be it known that I, ROBERT M. MERRIMAN, a citizen of the United States, residing at Akron, in the county of Summit and State of Ohio, have invented certain new and useful Improvements in Fabric Tires, of which the following is a specification.

My invention relates to new and useful improvements in pneumatic tires and more particularly in the outer casings, the primary object of my invention being the provision of a novel and improved form of fabric tire casing.

More specifically, my invention relates to the provision of a novel form of fabric ply for use in building up the tire casing, this ply being of such a nature and so employed that the strength of the casing is increased, the tire is more resilient, will heat less in use and, because of this added resiliency and because of the fact that it may be more uniformly inflated and the pressure more evenly distributed, a considerable saving in power is attained when driving motor vehicles equipped with my tire.

Under present conditions, fabric tires, as now manufactured, are built up of a plurality of plies of fabric embedded in rubber or some composition of rubber. These plies are formed from strips of fabric cut diagonally of the weave of the fabric in order that they may be stretched about the core upon which the tire is built and properly shaped thereon. As a result, the strips can only be of relatively short length, this length being dependent upon the width of the fabric, as manufactured, and the fabric, when applied to the core, is not only under strain but this strain is unevenly distributed, the portion of the fabric passing about the tread of the core being under greater strain than the portions of fabric along the sides.

My invention consists in providing fabric strips or plies so formed that they may be cut lengthwise or transversely of the weave of the fabric and applied to the core in building up the tire without being strained so that when they are embedded in the completed tire, the fabric plies are under no strain other than that of the air pressure within the tire and the weight of the vehicle carried by it. To accomplish this object I construct strips or plies of fabric which I cut either lengthwise or crosswise of the weave and the longitudinal edges of which are serrated to provide a plurality of spaced flaps or tongues along the side edges, the free ends of the tongues being spaced such a distance that when the fabric ply is wound circumferentially about the core and its side edges drawn down against the sides of the core, the inner or side edges of the flaps or tongues formed will engage against each other.

With these and other objects in view, my invention will be more fully described, illustrated in the accompanying drawing, and then specifically pointed out in the claims which are attached to and form a part of this application.

In the drawing: Figure 1 is a perspective view of a section of tire constructed in accordance with my invention, parts being broken away in order to render the disclosure more clear; Fig. 2 is a fragmentary plan view of the overlapping terminals of two strips of fabric as employed in the construction of my tire.

Corresponding and like parts are referred to in the following description and indicated in all the views of the drawing by the same reference characters.

In order to insure a clear and accurate understanding of my invention, I will first describe the fabric strips or plies employed in constructing a tire and then, in a general way, one method which may be employed in forming the tire with these plies or strips. Fragments of two fabric strips 10 and 11 are shown in Fig. 2. Each of these strips is substantially rectangular in shape, being somewhat greater in width than the transverse circumference of the tire to be constructed and of any desired length. These strips are cut from fabric of suitable material and weight, such as heavy canvas, and are cut either lengthwise or transversely of the weave, as indicated in the drawing. As a result, the warp threads of the fabric either run longitudinally or transversely of the strip, as the case may be, while the woof threads or strands, of course, run in the opposite direction. Inasmuch as the strips are cut from the fabric either transversely or longitudinally, it will be clear that the length of the strips, which may be formed, is in one instance only dependent upon the transverse width of the fabric from which the strip is cut and in the other instance upon the length of the entire strip. It is therefore possible, if desired, to provide strips of such a length that a single strip may be used to construct an entire tire, being passed circumferentially about the core a sufficient number of times to give the required thicknesses of fabric. The substantially rectangular strips or plies of fabric thus formed have their edges cut away or serrated, as shown at 12, to provide spaced flaps or tongues 13. The serrations thus formed are V-shaped and as a result the side edges of the flaps or tongues converge toward the free ends of such flaps or tongues. The width and depth of the serrations 12, of course, depend upon the cross sectional circumference and peripheral circumference of the tire to be constructed, in all instances being such that when the ply is wound with its longitudinal axis extending circumferentially of the core and its side edges are brought downwardly against the sides of the core, the side edges of adjacent tongues or flaps will abut against each other.

The tire may be constructed from plies of the above described character in the usual or any preferred way. For instance, as shown in Fig. 1, one ply of fabric may be wound circumferentially about a core, not shown, and its side edges brought down against the sides of the core, after which one or more additional plies may be superimposed upon it and their edges brought down against the sides of the core in the same manner, the plies of course being impregnated with rubber or a rubber composition to securely bind them together. A single ply or strip may be of such length as to extend entirely around the core or a number of shorter plies or strips may be employed, in which instance their abutting ends will be overlapped, as shown at the center of Fig. 2, so that a pair of opposed tongues or flaps at the end of one ply will be superimposed upon a corresponding pair of opposed tongues or flaps of the adjacent end of the other ply. After a number of plies, such as indicated at *a*, have been wound about the core, beads 14 may be positioned against the sides of the core in the usual manner and any desired number of additional plies *b* may be wound about the core and the ends of their flaps 13 passed about the beads, as shown at 15. Chafing strips of fabric 16 may be passed about the base of the beads outside of the outermost ply *b* and the tread and side walls 17 of the tire may be applied, a breaker strip 18 being generally embedded in the tread.

By constructing a tire from strips of fabric of the character described, a fabric casing or tire of much greater strength than usual may be formed and the resultant tire will be more resilient, and will heat less in use. Furthermore, as the plies of the tire are normally under no strain, except that of the air contained in the tire and the weight of the vehicle, not being unevenly stretched about the core, a more uniform inflation of the tire and equal expansion of the casing as a whole is attained, with the result that a vehicle equipped with tires of this character can be driven with less expenditure of power. Obviously, tires of this character can be construted upon cores such as those now in use. In forming the tire, care should be taken that the tongues of each ply shall break joint with the abutting edges of those of an adjacent ply, as clearly shown in Fig. 1.

Although I have illustrated and described a tire constructed from fabric strips of the character set forth, it will of course be understood that I do not wish to limit myself to the specific construction shown, but reserve the right to make any changes in the application of the fabric plies or in the general construction of the tire without in the slightest degree departing from the spirit of my invention, as set forth in the appended claims.

Having thus described the invention, what is claimed as new is:—

1. In a tire construction, a plurality of plies of substantially uniformly woven fabric cut with the weave and having their longitudinal edges serrated to provide spaced tongues, the plies being superimposed one upon the other, tread and side wall portions superimposed upon the outer fabric ply, and a breaker strip embedded in the tread and side portions and projecting at its edges into the side walls of the tire below the inner lines of the serrations of the fabric plies.

2. A tire construction embodying a plurality of superimposed plies of fabric, each ply being cemented to all adjacent plies and all being embedded in the body of the tire and each ply of fabric being of substantially uniform weave with certain of its threads extending circumferentially of the tire and the other threads transversely thereof, the side edges of each ply of fabric being notched to provide tongues, the edges of which abut against each other when the ply is shaped to the tire, the tongues of each ply breaking joint with the abutting edges of those of an adjacent ply.

In testimony whereof I affix my signature.

ROBERT M. MERRIMAN. [L. S.]